(12) United States Patent
Matsushita

(10) Patent No.: US 9,910,422 B2
(45) Date of Patent: Mar. 6, 2018

(54) ERROR IDENTIFICATION METHOD OF MACHINE TOOL

(71) Applicant: Okuma Corporation, Niwa-Gun (JP)

(72) Inventor: Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 256 days.

(21) Appl. No.: 15/011,997

(22) Filed: Feb. 1, 2016

(65) Prior Publication Data

US 2016/0246282 A1    Aug. 25, 2016

(30) Foreign Application Priority Data

Feb. 23, 2015   (JP) .................................. 2015-033178

(51) Int. Cl.
*G05B 19/401* (2006.01)
*G05B 19/404* (2006.01)

(52) U.S. Cl.
CPC .. *G05B 19/404* (2013.01); *G05B 2219/49193* (2013.01)

(58) Field of Classification Search
None
See application file for complete search history.

(56) References Cited

U.S. PATENT DOCUMENTS

| | | | | |
|---|---|---|---|---|
| 8,786,243 B2* | 7/2014 | Mori | ...................... | B23Q 17/22 318/400.12 |
| 9,784,554 B2* | 10/2017 | Gray | ...................... | G01B 5/25 |
| 2006/0254364 A1* | 11/2006 | Matsushita | ............ | B25J 9/1623 73/760 |
| 2010/0207567 A1* | 8/2010 | Mori | ...................... | B23Q 17/22 318/632 |
| 2010/0241394 A1* | 9/2010 | Ihara | ...................... | G01B 21/24 702/151 |
| 2011/0040523 A1 | 2/2011 | Matsushita | | |
| 2013/0139660 A1* | 6/2013 | Maxted | ................ | G05B 19/401 82/1.11 |
| 2015/0051727 A1* | 2/2015 | Hasegawa | ................ | B23H 7/06 700/162 |

FOREIGN PATENT DOCUMENTS

JP         2011-038902 A1    2/2011

* cited by examiner

*Primary Examiner* — Benjamin Sandvik
(74) *Attorney, Agent, or Firm* — Burr & Brown, PLLC

(57) ABSTRACT

An error identification method of a machine tool includes an initial position measurement step of indexing a main spindle head rotation axis to an initial angle to measure an initial position of a measured jig, a table reference angle calculation step of calculating a reference angle of the table, a reference position measurement step of indexing the table rotation axis to the reference angle and indexing the main spindle head rotation axis to the initial angle, a relative position measurement step of respectively indexing the table rotation axis and the main spindle head rotation axis to a plurality of predetermined angles, an arc approximation step of approximating the plurality of measured position values into an arc, and an error calculation step of calculating an error of a center position of the rotation axis, a tilt error of the rotation axis, or a tilt error of the translational axis.

4 Claims, 5 Drawing Sheets

ERROR IDENTIFICATION METHOD OF MACHINE TOOL

BACKGROUND

This application claims the benefit of Japanese Patent Application Number 2015-033178 filed on Feb. 23, 2015 the entirety of which is incorporated by reference.

TECHNICAL FIELD

The present invention relates to a method for identifying a geometric error between respective axes of a machine tool. The machine tool includes a main spindle head configured to mount a tool, a table configured to hold a workpiece, at least three translational drive axes, at least one rotational drive axis configured to perform a rotational motion on the main spindle head, and at least one rotational drive axis configured to perform a rotational motion on the table.

RELATED ART

As a machine tool for machining components and molds having a complex shape, there has been known a five-axis controlled machine tool that includes three translational axes and two rotation axes. FIG. 1 illustrates an example of the five-axis controlled machine tool. A main spindle head 2 of the five-axis controlled machine tool incorporates a rotatable main spindle (not illustrated) such that a tool mounted to the main spindle can be rotated. The main spindle head 2 is movable with two translational degrees of freedom with respect to a bed 1 indirections of the X-axis and the Z-axis which are the translational axes and are perpendicular to one another. A table 3 to which a workpiece can be mounted is movable with one rotational degree of freedom with respect to a cradle 4 in the C-axis which is the rotation axis. The cradle 4 can be moved with one rotational degree of freedom with respect to a trunnion 5 in the A-axis which is the rotation axis. The A-axis and the C-axis are perpendicular to one another. Furthermore, the trunnion 5 is movable with one translational degree of freedom with respect to the bed 1 in a direction of the Y-axis which is the translational axis and perpendicular to the X-axis and Z-axis. Accordingly, the main spindle head 2 is movable with three translational degrees of freedom and two rotational degrees of freedom with respect to the table 3. Each feed axis is driven by a servo motor which is controlled by a numerical control unit (not illustrated). Thus, the relative position and the relative posture of the tool with respect to the workpiece are controlled to ensure machining the workpiece.

However, with the five-axis controlled machine tool as described above, geometric errors occur between the respective axes. Specifically, it has been known that there are 13 types of the geometric errors in total, i.e. a C-axis center position X direction error, an offset error between C-A-axes, an A-axis angle offset error, a squareness error between C-A-axes, an A-axis center position Y direction error, an A-axis center position Z direction error, a squareness error between A-X-axes, a squareness error between A-Y-axes, a squareness error between X-Y-axes, a squareness error between Y-Z-axes, and a squareness error between Z-X-axes (denoted as $\delta X_{ca}$, $\delta Y_{ca}$, $\alpha_{ca}$, $\beta_{ca}$, $\delta Y_{ay}$, $\delta Z_{ay}$, $\beta_{ay}$, $\gamma_{ay}$, $\gamma_{yx}$, $\alpha_{xz}$, $\beta_{xz}$, $\alpha_{zt}$, and $\beta_{zt}$, respectively). $\delta X_{ca}$, $\delta Y_{ca}$, $\delta Y_{ay}$, and $\delta Z_{ay}$ define center position errors of the rotation axes, $\alpha_{ca}$, $\beta_{ca}$, $\beta_{ay}$, and $\gamma_{ay}$ define tilt errors of the rotation axes, $\gamma_{yx}$, $\alpha_{xz}$, and $\beta_{xz}$ define squareness between translational axes.

However, the geometric errors deteriorate the motion accuracy of the machine tool, which causes deterioration of the machining accuracy of the workpiece. Therefore, for highly-accurate machining, it is necessary to measure and identify the magnitude of geometric errors and perform correction by the amount of the geometric errors. As means for measuring and identifying such geometric error, the method as disclosed in Japanese Unexamined Patent Application Publication No. 2011-38902 (hereinafter referred to as Patent Literature 1) has been known. In the method, the reference ball is installed on the table, the touch trigger probe is installed to the main spindle head, and the rotation axis is indexed to various angles. The center position of the reference ball is measured by the touch trigger probe. The arc trajectory is approximated and calculated from the measured values at the center position of the reference ball. Based on the arc error calculated from the arc trajectory, the geometric error is identified.

With the method for identifying the geometric error disclosed in Patent Literature 1, the following is possible. The geometric errors, total in 11 types of the center errors of rotation axis, the tilt errors of rotation axis, and the squareness errors between translational axes, namely, $\delta X_{ca}$, $\delta Y_{ca}$, $\alpha_{ca}$, $\beta_{ca}$, $\delta Y_{ay}$, $\delta Z_{ay}$, $\beta_{ay}$, $\gamma_{ay}$, $\gamma_{yx}$, $\alpha_{xz}$, and $\beta_{xz}$ can be identified among the above-described 13 types of geometric errors.

However, five-axis controlled machine tools have not only a so-called tilting rotary table type, but also a so-called rotary table/swivel head type. The tilting rotary table type, as illustrated in FIG. 1, includes the two rotation axes on the table side with respect to the translational axis. The rotary table/swivel head type includes one rotation axis on the table side with respect to the translational axis and the other rotation axis on the main spindle head side with respect to the translational axis.

However, when applying the method for identifying the geometric error as disclosed in Patent Literature 1 to the five-axis controlled machine tool of the rotary table/swivel head type, the center errors $\delta X_{bt}$ and $\delta Z_{bt}$ of these rotation axes cannot be identified from the first-order components of the radial direction components of the rotation axis (the B-axis) on the main spindle head side. The method can only obtain $\delta Z_{bt}$ from the zero-order component. Therefore, caused by the error of the installation position of the reference ball, all the center errors of the rotation axes of the rotary table/swivel head type cannot be identified (This problem will be described in detail in DETAILED DESCRIPTION).

An object of the present invention is to solve the problem of the conventional method for identifying the geometric error. The present invention provides the error identification method that allows identifying all (simultaneously identifying) center position errors of rotation axes, tilt errors of the rotation axes, and squareness errors of translational axes among the geometric errors of the five-axis controlled machine tool of the rotary table/swivel head type that includes one axis of the rotation axes on each of the table side and the main spindle head side with respect to the translational axis.

SUMMARY

In order to achieve the above-described object, the present invention provides an error identification method for identifying a geometric error of axes in a machine tool which has a table configured to hold a workpiece, one or more main spindle head configured to mount a tool, three or more axes of translational axes, one or more axis of a table rotation axis configured to perform a rotational motion on the table, and one or more axis of a main spindle head rotation axis configured to perform a rotational motion on the main spindle head. In an aspect of the present invention, the error identification method of the machine tool includes a step of mounting one of a measured jig and a position measurement sensor to one of the main spindle head and the table, or mounting another of the measured jig and the position measurement sensor to another of the main spindle head and the table. The method further includes an initial position measurement step of indexing the main spindle head rotation axis to an initial angle to measure an initial position of the measured jig using the position measurement sensor, a table reference angle calculation step of calculating a reference angle from an angle of the table rotation axis in the initial position measurement step, a reference position measurement step of indexing the table rotation axis to the reference angle and indexing the main spindle head rotation axis to the initial angle to measure a reference position of the measured jig by the position measurement sensor, a relative position measurement step of indexing the table rotation axis to a plurality of predetermined angles based on the reference angle of the table rotation axis and indexes the main spindle head rotation axis to a plurality of predetermined angles to measure each position of the measured jig by the position measurement sensor, an arc approximation step of approximating the plurality of measured position values measured at the relative position measurement step into an arc, and an error calculation step of calculating an error of a center position of the rotation axis, a tilt error of the rotation axis, or a tilt error of the translational axis from the arc approximated in the arc approximation step.

DETAILED DESCRIPTION

The following describes one embodiment of an error identification method of a machine tool according to the present invention (an example of using a five-axis controlled machine tool of a rotary table/swivel head type) in detail with reference to the drawings.

Figure 1:
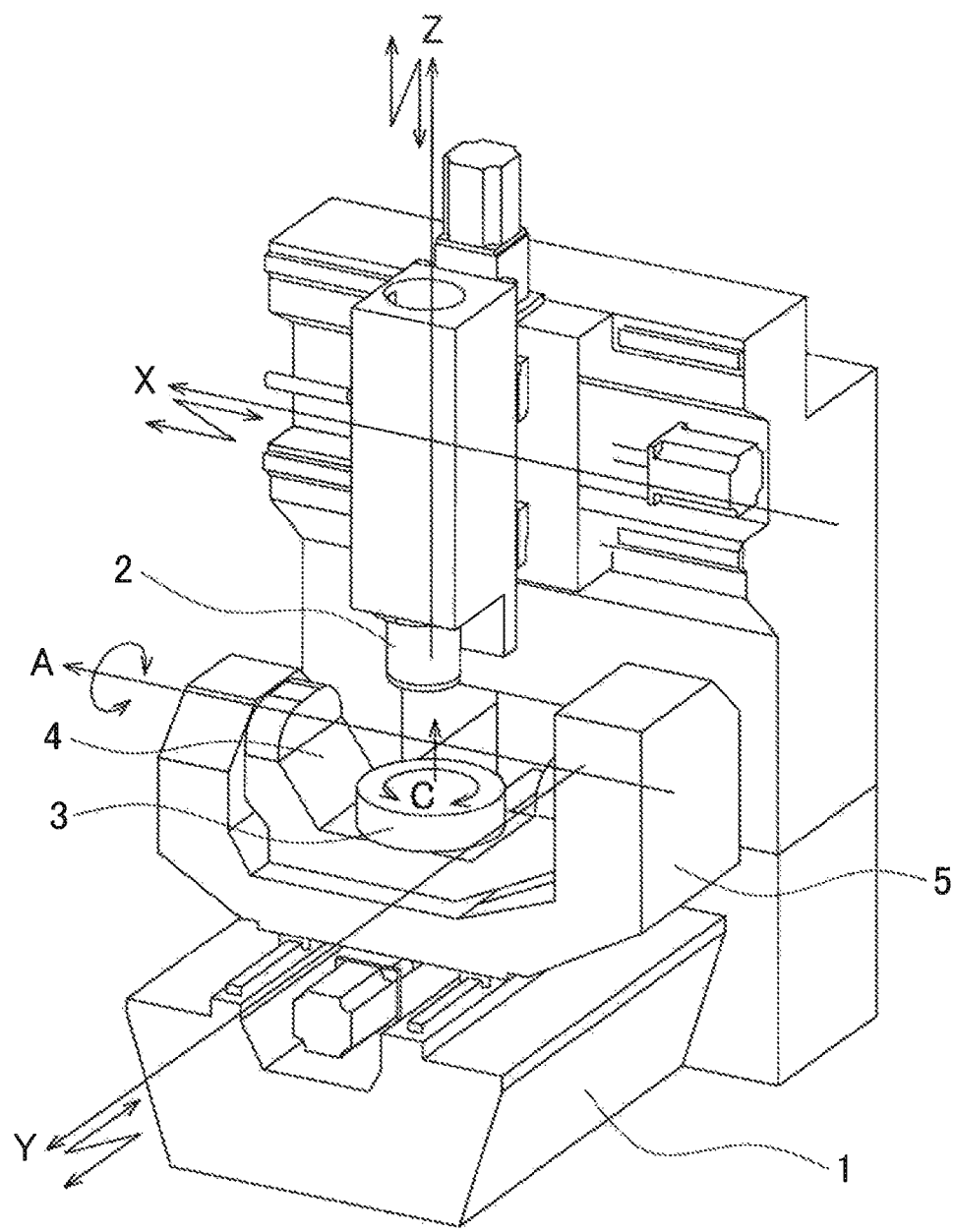
FIG. 1 is a schematic diagram of a five-axis controlled machine tool that has two axes of rotation axes on a table side.
Figure 2:
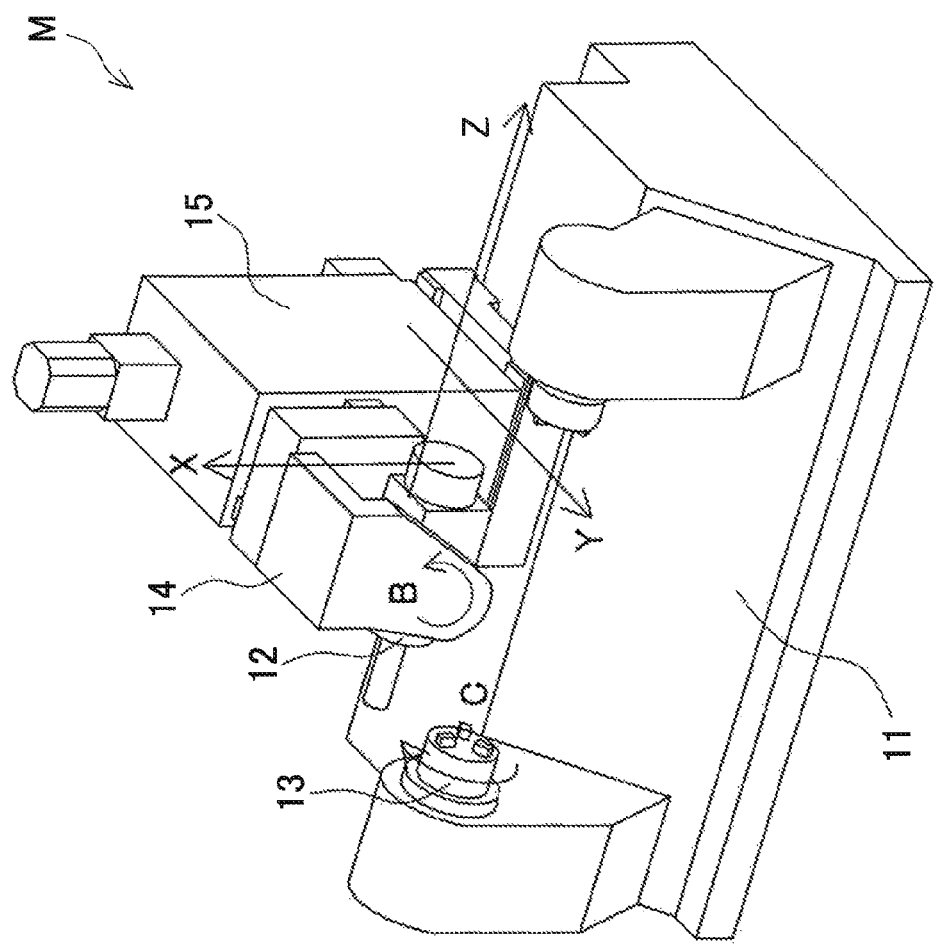
FIG. 2 is a schematic diagram of a five-axis controlled machine tool that has one axis of rotation axis on each of a table side and a main spindle head side.

FIG. 2 illustrates an example of the five-axis controlled machine tool of the rotary table/swivel head type. A main spindle head 12 of a five-axis controlled machine tool 5 incorporates a rotatable main spindle (not illustrated) such that a tool mounted to the main spindle can be rotated. The main spindle head 12 rotates about a B-axis (a rotational axis on the main spindle head side) in a tool post 14, which allows a motion of one degree of freedom for rotation with respect to the tool post 14. Further, the main spindle head 12 supported by a column 15 is movable in directions of an X-axis, a Y-axis, and a Z-axis which are perpendicular to one another and allow a motion of three degrees of freedom for translation with respect to a bed 11. A table 13 to which a workpiece is mounted rotates about a C-axis (a rotational axis on the table side), which allows a motion of one degree of freedom for rotation with respect to the bed 11. Accordingly, the main spindle head 12 allows the motions of three degrees of freedom for translation and two degrees of freedom for rotation with respect to the table 13. Servo motors, which are controlled by a numerical control unit (not illustrated), drive the respective feed axes. Thus, the feed axes control the relative position and the relative posture of the tool with respect to the workpiece, ensuring machining the workpiece. A five-axis controlled machine tool M incorporates an NC control unit (not illustrated). This control unit includes a storage unit, which can store various values.

In the five-axis controlled machine tool M of the rotary table/swivel head type in FIG. 2, there are 13 types of geometric errors in total, i.e. a B-axis center position X direction error, a B-axis center position Z direction error, squareness between B-Z-axes, squareness between B-X-axes, a C-axis center position X direction error, a C-axis center position Y direction error, squareness between C-Y-axes, squareness between C-X-axes, a squareness error between X-Y-axes, a squareness error between Y-Z-axes, a squareness error between Z-X-axes, squareness between the main spindle-B-axis, and a B-axis angle offset error (denoted by signs of $\delta X_{bt}$, $\delta Z_{bt}$, $\alpha_{xb}$, $\gamma_{xb}$, $\delta X_{cz}$, $\delta Y_{cz}$, $\alpha_{cz}$, $\beta_{cz}$, $\gamma_{yx}$, $\alpha_{zy}$, $\beta_{yx}$, $\alpha_{bt}$, and $\beta_{bt}$, respectively) are present. $\delta X_{bt}$, $\delta Z_{bt}$, $\delta X_{cz}$, and $\delta Y_{cz}$ are center position errors of the rotation axes, $\alpha_{xb}$, $\delta_{xb}$, $\alpha_{cz}$, and $\beta_{cz}$ are tilt errors of the rotation axes, and $\delta_{yz}$, $\alpha_{zy}$, and $\beta_{yx}$ are squareness between translational axes.

Figure 3:
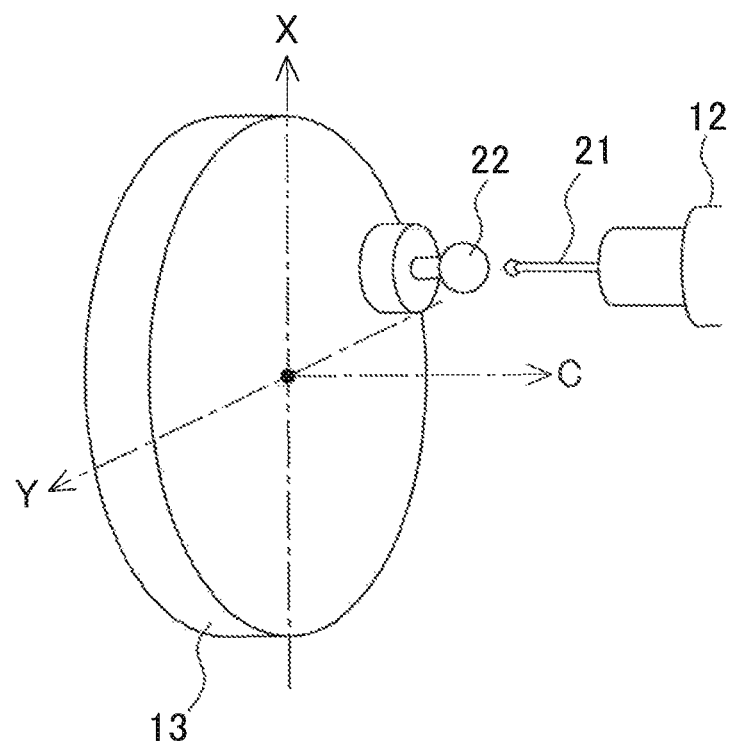
FIG. 3 is a schematic diagram of a target ball installed at an initial position together with a touch trigger probe.

The error identification method according to the present invention mounts a touch trigger probe 21, which is as illustrated in FIG. 3, to the main spindle head 12 of the five-axis controlled machine tool M. A target ball 22, which is a target for measurement, is secured to the table 13 with a magnet or a similar member to measure the center position. The following method can also be employed. The touch trigger probe 21 is secured to the table 13 with the magnet or a similar member. A tool including the target ball 22, which is the target for measurement, is mounted to the main spindle head 12.

The touch trigger probe 21 includes a sensor that senses a contact with the measurement target. When sensing the contact, the touch trigger probe 21 can emit signals with infrared, radio wave, or a similar method. A receiver is coupled to a numerical control unit (not illustrated) built into the machine tool. The touch trigger probe 21 measures current positions of respective axes at the moment when the receiver receives the signal or at the time point of accommodating the delay at a predetermined timing. The touch trigger probe 21 then stores these values as measured values. To measure the center position of the ball by the touch trigger probe 21, in the case where the radius of the ball has been already known, at least three points, if not already known, at least four points are brought in contact by the touch trigger probe 21 and measured, thus ensuring obtaining the center position. That is, the touch trigger probe 21 finictions as a sensor to measure the center position of the target ball 22. This position measurement sensor is not limited to a touch trigger probe. As the position measurement sensor, a laser displacement meter which can contactlessly measure a distance, a device which uses three or more displacement sensors and simultaneously brings the displacement sensors in contact with the ball to obtain the center position of the ball from respective measured values, or a similar device can also be used.

Problems in Conventional Method for Identifying Geometric Error

When the five-axis controlled machine tool M of the rotary table/swivel head type in FIG. 2 obtains the geometric error by the method for identifying the geometric error as described in Patent Literature 1, the following problem occurs. That is, assume the case where the C axis is indexed to 0° and the B-axis is indexed ton pieces of angles $b_j$ (j=1 to n), and the position is measured. Arc errors of the B-axis radial direction components of measured values at the reference ball center position of the B-axis angle $b_j$ can be expressed by the Fourier coefficients from zero order to second order, $s_{a0}$, $s_{a1}$, $s_{b1}$, $s_{a2}$, and $s_{b2}$ like Expression 1.

$$\Delta R_{Bj} = s_{a0} + s_{a1} \cos b_j + s_{b1} \sin b_j + s_{a2} \cos 2b_j + s_{b2} \sin 2b_j \quad \text{[Expression 1]}$$

The Fourier coefficients of the above-described Expression 1, namely, the relationship between the arc error and the geometric error is Expression 2. Here, $R_c$ is a distance from the C-axis center to the reference ball center. H is the height of the reference ball. $R_{st}$ is a distance from the distal end of the touch trigger probe to the B-axis center. Assume that an error ($\delta X_w$, $\delta Y_w$, or $\delta Z_w$) occurs in the installation position of the reference ball.

$$s_{a0} = -\delta Z_{bt}$$

$$s_{a1} = -\delta Z_w + (\beta_{cz} + \beta_{yx}) R_c$$

$$s_{b1} = -\delta X_w - \delta X_{cz} - \beta_{cz} H$$

$$s_{a2} = 0$$

$$s_{b2} = \beta_{yx} R_{st}/2 \quad \text{[Expression 2]}$$

When using the method for identifying the geometric error in Patent Literature 1 by the five-axis controlled machine tool of a tilting rotary table type, the center errors of the rotation axes can be obtained from the first-order components of the radial direction components of the respective rotation axes. That is, the center errors of the A-axis $\delta Y_{ay}$ and $\delta Z_{ay}$ can be obtained from the radial direction components of the A-axis. The center errors of the C-axis $\delta X_{ca}$ and $\delta Y_{ca}$ can be obtained from the radial direction components of the C-axis.

However, assume the case where the method for identifying the geometric error in Patent Literature 1 is used by the five-axis controlled machine tool of the rotary table/swivel head type like FIG. 2. As seen from Expression 2, from the first-order components of the radial direction components of the B-axis, the center errors of the B-axis $\delta X_{bt}$ and $\delta Z_{bt}$ cannot be identified, but only $\delta Z_{bt}$ can be obtained from the zero-order components. Accordingly, caused by the error in the installation position of the reference ball, all the center errors in the rotation axes cannot be identified.

Error Identification Method According to Disclosure

Figure 4:
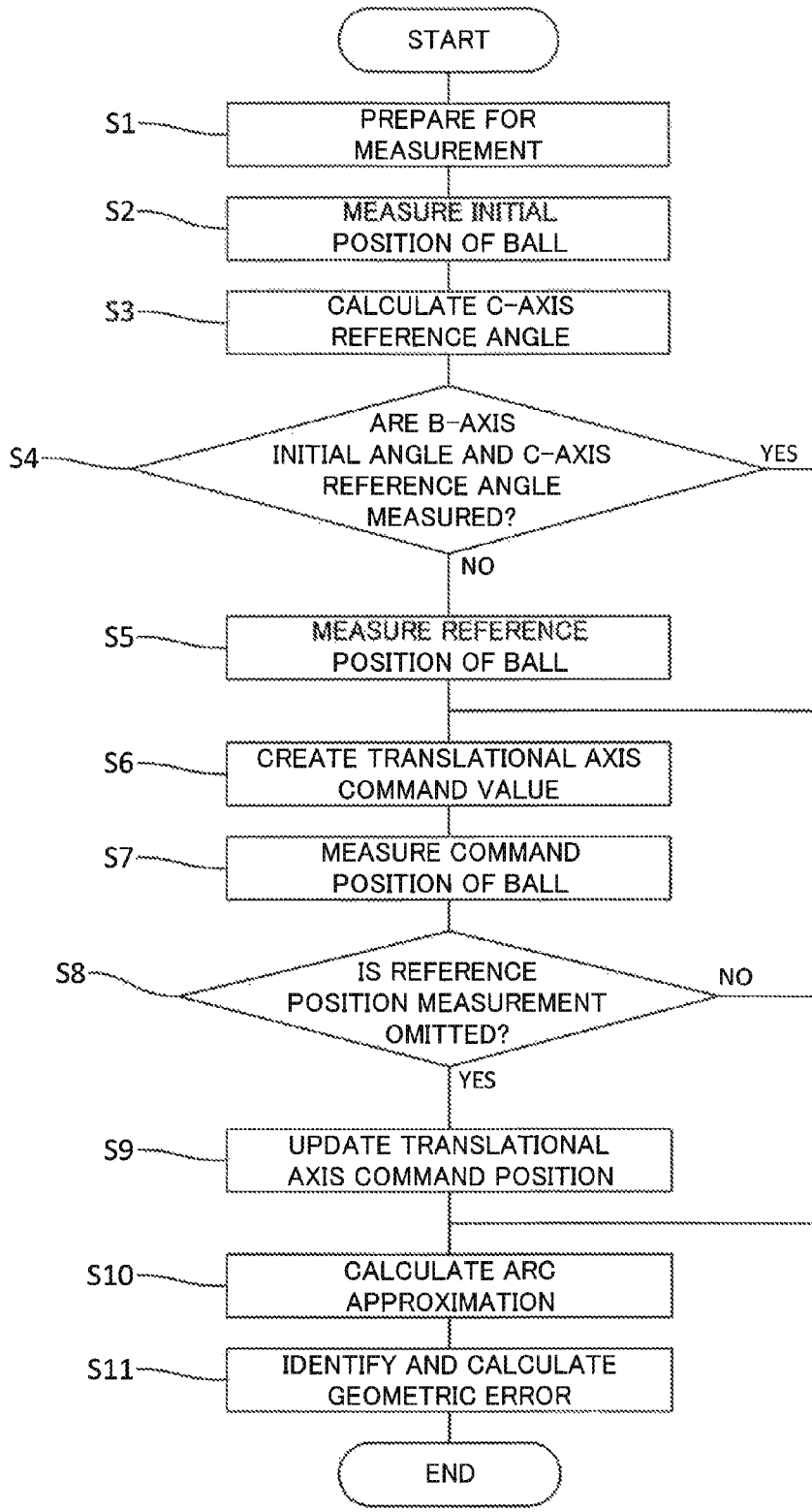
FIG. 4 is a flowchart illustrating measurement and identification methods of a geometric error.
Figure 5:
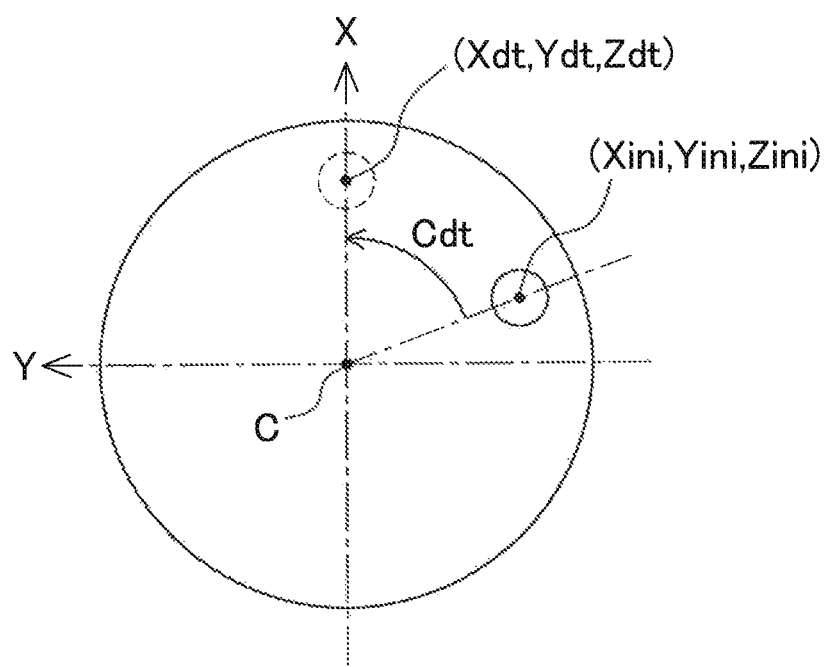
FIG. 5 is a schematic diagram of an initial position, a reference position, and a C-axis reference angle of the target ball.

The error (the geometric error) identification method according to the present invention has been invented to solve the problem when using the method for identifying the geometric error in Patent Literature 1 by the five-axis controlled machine tool M of the rotary table/swivel head type. The following describes the error identification method with reference to the flowchart in FIG. 4. To measure and identify the geometric error, first, at the Step S1, preparation is made for measurement. That is, the target ball 22 is secured to any position on the table 13 with a magnet or a similar member. Next, the touch trigger probe 21 is mounted to the main spindle head 12. The B-axis is indexed to an initial angle. The touch trigger probe 21 is positioned at a part close to the apex of the target ball 22 in the Z-axis direction. Here, the initial angle of the B-axis is set to 0°.

Next, at Step S2, using the touch trigger probe 21, the initial position of the target ball 22 is measured. After that, at Step S3, the reference angle of the C-axis is calculated from the initial position of the target ball 22. The reference angle of the C-axis is the C-axis angle when the center of the target ball 22 is positioned on the positive side on the X-axis. When the C-axis angle during measurement of the initial position of the target ball 22 is $C_{ini}$ and the measured values of the initial position are ($X_{ini}$, $Y_{ini}$, and $Z_{ini}$), a reference angle $C_{dt}$ of the C-axis is obtained by Expression 3. Here, an arctangent function obtains a solution of any of $-180°$ to $180°$ using a so-called atan 2 function.

$$C_{dt} = C_{ini} + \tan^{-1}(Y_{ini}/X_{ini}) \quad \text{[Expression 3]}$$

Next, at Step S4, among combinations of preset B/C-axis angle command values, whether the combination of the B-axis at the initial angle and the C-axis at the reference angle is present or not is determined. Here, the C-axis angle command value is an angle from the reference angle of the C-axis. For example, as a measurement condition 1, when measuring the B-axis angle command value at 11 points at 15°-intervals in a range of $-30°$ to $120°$ at the C-axis angle command value of $0°$. For example, as a measurement condition 2, when measuring the B-axis angle command value at 8 points at 45°-intervals in a range of $0°$ to $315°$ at the C-axis angle command value of $0°$. The combination of the rotation axis command values of the measurement condition 1 is ($b_i$ and $c_i$) and the combination of the rotation axis command values of the measurement condition 2 is ($b_j$ and $c_j$). Here, i=1 to 11 and j=1 to 8.

Here, in ($b_i$ and $c_i$) and ($b_j$ and $c_j$), the combination of the B-axis of $0°$ and the C-axis of $0°$ is present. Therefore, it is determined that the combination of the B-axis at the initial angle and the C-axis at the reference angle is present. Then, in the case where it is determined that the combination of the B-axis at the initial angle and the C-axis at the reference angle is absent, Step S5 is performed. When determined as present, Step S6 is performed.

At Step S5, the reference position of the target ball 22 is measured. That is, the C-axis is indexed to the reference angle $C_{dt}$ and the B-axis is indexed to the initial angle of $0°$. The center position of the target ball 22 is measured by the touch trigger probe 21.

At the subsequent Step S6, command values of translational axes are calculated. Then, in the case where the reference position of the target ball 22 has been measured, the command value is calculated using the respective B/C-axis angle command values, a geometrical parameter (a distance from the distal end of the touch trigger probe 21 to the B-axis center), and the center measured value of the target ball 22 at the reference position. When not measuring the reference position of the target ball 22, the command value is calculated using the respective B/C-axis angle command values, the geometrical parameter, the center measured value of the target ball 22 at the initial position, and a difference value between the initial angle of the C-axis and the reference angle of the C-axis. Here, under the measurement condition 1, the command values ($X_{Bi}$, $Y_{Bi}$, and $Z_{Bi}$) are obtained. Under the measurement condition 2, the command values ($X_{Cj}$, $Y_{Cj}$, and $Z_{Cj}$) are obtained.

After that, at Step S7, the center position of the target ball 22 is measured based on the command values of the respective rotation axes by the touch trigger probe 21. Here, under the measurement condition 1, the measured values ($X_{Bi}'$, $Y_{Bi}'$, and $Z_{Bi}'$) are obtained. Under the measurement condition 2, the measured values ($X_{Cj}'$, $Y_{Cj}'$, and $Z_{Cj}'$) are obtained.

Furthermore, at Step S8, whether the measurement of the reference position is skipped or not is determined. If skipped, Step S10 is performed. If not skipped, Step S9 is performed.

At Step S9, the command values of the translational axes are updated. The measured center position value of the target ball 22 at the C-axis angle command value of 0° and the B-axis angle command value of the initial angle of the B-axis is determined as the measured value at the reference position. Using the respective B/C-axis angle command values, the geometrical parameter, and the center measured value of the target ball 22 at the reference position, each translational axis command value is calculated again. The re-calculated translational axis command values are each updated and stored.

After that, at Step S10, arc approximation is performed on the respective measured values. That is, the radial direction components of the B-axis $\Delta R_{BRi}$ and the axial direction components of the B-axis $\Delta R_{BAi}$ at the respective measured values under the measurement condition 1 and the radial direction components of the C-axis $\Delta R_{CRj}$ and the axial direction component of the C-axis $\Delta R_{CAj}$ at the respective measured values under the measurement condition 2 are obtained by Expression 4.

$$\Delta R_{BRi} = (Z_{Bi}' - Z_{Bi})\cos b_i + (X_{Bi}' - X_{Bi})\cos b_i$$

$$\Delta R_{BAi} = Y_{Bi}' - Y_{Bi}$$

$$\Delta R_{CRj} = (X_{Cj}' - X_{Cj})\cos(-c_j) + (Y_{Cj}' - Y_{Cj})\cos(-c_j)$$

$$\Delta R_{CAj} = Z_{Cj}' - Z_{Cj} \qquad \text{[Expression 4]}$$

Here, $\Delta R_{BRi}$ and $\Delta R_{CRj}$ can be expressed by the Fourier coefficients from zero to second orders, and $\Delta R_{BAi}$ and $\Delta R_{CAj}$ can be expressed by the Fourier coefficients from zero and first orders like Expression 5. That is, the radial direction components and the axial direction components of the measured values can be approximated into an arc.

$$\Delta R_{BRi} = r_{Ba0} + r_{Ba1}\cos b_i + r_{Bb1}\sin b_i + r_{Ba2}\cos 2b_i + r_{Bb2}\sin 2b_i$$

$$\Delta R_{ARi} = x_{Ba0} + x_{Ba1}\cos b_i + x_{Bb1}\sin b_i$$

$$\Delta R_{CRj} = r_{Ca0} + r_{Ca1}\cos(-c_j) + r_{Cb1}\sin(-c_j) + r_{Ca2}\cos 2(-c_j) + r_{Bb2}\sin 2(-c_j)$$

$$\Delta R_{CAj} = x_{Ca1}\cos(-c_j) + x_{Cb1}\sin(-c_j) \qquad \text{[Expression 5]}$$

The above-described Expression 5 is solved by least squares method or a similar method to calculate each Fourier coefficient, namely, each arc error.

After that, at Step S11, the geometric error is calculated from the arc errors of the measured values. Here, under the measurement condition 1, considering that the errors ($\delta X_w$, $\delta Y_w$, and $\delta Z_w$) at the installation position of the target ball 22 at the reference position is caused by the geometric errors at the position, the relationship between the Fourier coefficients of the B-axis radial direction components $r_{Ba0}$, $r_{Ba1}$, $r_{Bb1}$, $r_{Ba2}$, and $r_{Bb2}$ and the geometric errors is Expression 6. Here, $R_{st}$ is a distance from the distal end of the touch trigger probe 21 to the B-axis center. Accordingly, the first-order component includes the B-axis center errors $\delta Z_{bt}$ and $\delta X_{bt}$.

$$r_{Ba0} = -\delta Z_{bt}$$

$$r_{Ba1} = -\delta Z_{bt}$$

$$r_{Bb1} = \delta X_{bt} - (\beta_{yx} + \beta_{bt})R_{st}$$

$$r_{Ba2} = 0$$

$$r_{Bb2} = \beta_{yx}R_{st}/2 \qquad \text{[Expression 6]}$$

Meanwhile, the relationship between the Fourier coefficients of the B-axis axial direction components $X_{Ba0}$, $X_{Ba1}$, and $X_{Bb1}$ and the geometric errors is Expression 7. Here, $R_c$ is a distance from the center of the C-axis to the center of the target ball 22. H is the height of the target ball 22.

$$x_{Ba0} = -\gamma_{yx}R_c - \delta Y_w - \delta Y_{cz} + \alpha_{cz}H - \alpha_{bt}R_{st}$$

$$x_{Ba1} = (\alpha_{xb} + \alpha_{zy})R_{st}$$

$$x_{Bb1} = -\gamma_{xb}R_{st} \qquad \text{[Expression 7]}$$

Under the measurement condition 2, the relationship between the Fourier coefficients of the C-axis radial direction components $r_{Ca0}$, $r_{Ca1}$, $r_{Cb1}$, $r_{Ca2}$, and $r_{Cb2}$ and the geometric errors is Expression 8.

$$r_{Ca0} = -\delta X_w$$

$$r_{Ca1} = -\delta X_{cz} - \delta X_{bt} + (\beta_{cz} + \beta_{yx} + \beta_{bt})H$$

$$r_{Cb1} = -\delta Y_{cz} - \alpha_{cz}H + (\alpha_{zy} + \alpha_{xb} + \alpha_{bt})R_{st}$$

$$r_{Ca2} = 0$$

$$r_{Cb2} = -\gamma_{yx}R_c/2 \qquad \text{[Expression 8]}$$

Meanwhile, the relationship between the Fourier coefficients of the C-axis axial direction components $x_{Ca0}$, $x_{Ca1}$, and $x_{Cb1}$ and the geometric errors is Expression 9.

$$r_{Ca0} = -\delta Z_w - \delta Z_{bt}$$

$$r_{Ca1} = (\beta_{cz} + \beta_{yx})R_c$$

$$r_{Cb1} = (\alpha_{cz} + \alpha_{zy})R_c \qquad \text{[Expression 9]}$$

By using the above-described Expression 6 to Expression 9, the geometric errors $\delta X_{bt}$, $\delta Z_{bt}$, $\alpha_{xb}$, $\gamma_{xb}$, $\delta X_{cz}$, $\delta Y_{cz}$, $\alpha_{cz}$, $\beta_{cz}$, $\gamma_{yx}$, and $\beta_{yx}$ are obtained from the calculated $r_{Ba1}$, $r_{Bb1}$, $r_{Bb2}$, $x_{Ba1}$, $x_{Bb1}$, $r_{Ca1}$, $r_{Cb1}$, $r_{Cb2}$, $x_{Ca1}$, and $x_{Cb1}$. However, $\alpha_{zy}$ cannot be obtained. Because, with the five-axis controlled machine tool M of the rotary table/swivel head type as illustrated in FIG. 2, the measured values do not draw an arc trajectory on the Y-Z plane.

As described above, the execution of S1 to S11 ensures identifying the four center position errors of the rotation axes, the four tilt errors of the rotation axes, and the two squareness between the translational axes.

Effects of Error Identification Method of Machine Tool

As described above, according to the error identification method of the present invention, among the geometric errors of the five-axis controlled machine tool M of the type including each one axis of the rotation axes on the table side and the main spindle head side with respect to the translational axis, the four center position errors of the rotation axes, the four tilt errors of the rotation axes, and the two squareness of the translational axes can be accurately identified by the simple control content and in an extremely short period.

Modifications of Error Identification Method of Machine Tool

The error identification method of machine tool according to the present invention is not limited to the aspects of the above-described embodiments. The contents of the initial position measurement step (S2 in the embodiment), the table reference angle calculation step (S3 in the embodiment), the reference position measurement step (S7 in the embodiment), the relative position measurement step (in S9 the embodiment), the arc approximation step (S10 in the embodiment), and the error calculation step (S11 in the embodiment) can be appropriately changed as necessary.

The machine tool to which the error identification method of machine tool according to the present invention is applicable is not limited to general machine tools such as a machining center, a lathe, a multitasking machine, and a grinder. The error identification method according to the present invention is also applicable to industrial machinery, a robot, or a similar machine. Furthermore, the machine tool to which the error identification method according to the present invention is applicable is not limited to the machine tool with the number of axes from the main spindle head to the table is five axes. The error identification method is also applicable to the machine tool with six or more axes.

The present invention provides another aspect as follows. In the relative position measurement step, when combinations of the plurality of predetermined angles of the table rotation axis and the plurality of predetermined angles of the main spindle head rotation axis include a combination of the reference angle of the table rotation axis and the initial angle of the main spindle head rotation axis, the reference position measurement step is skipped. The relative position measurement step indexes the table rotation axis to the reference angle. The relative position measurement step determines the measured position value as a measured value at the reference position. The measured position value is measured by indexing the main spindle head rotation axis to the initial angle.

The present invention provides another aspect as follows. The arc approximation step calculates a difference value between a command position of the measured jig and a measured position value of the measured jig using a predetermined angle of each of the rotation axes in the relative position measurement step. The command position is found by coordinates transformation of the measured value at the reference position. A plurality of the difference values are approximated into an arc.

With the present invention, among the geometric errors of the five-axis controlled machine tool, which is a type having each one axis of the rotation axes on the table side and the main spindle head side with respect to the translational axis, four center position errors of the rotation axes, four tilt errors of the rotation axes, and two squareness of the translational axes can be simultaneously identified.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An error identification method for identifying a geometric error of axes in a machine tool including a table configured to hold a workpiece, one or more main spindle head configured to mount a tool, three or more axes of translational axes, one or more axis of a table rotation axis configured to perform a rotational motion on the table, and one or more axis of a main spindle head rotation axis configured to perform a rotational motion on the main spindle head, the error identification method comprising;
    a mounting step of mounting one of a measured jig and a position measurement sensor to one of the main spindle head and the table, or mounting another of the measured jig and the position measurement sensor to another of the main spindle head and the table, an initial position measurement step of indexing the main spindle head rotation axis to an initial angle to measure an initial position of the measured jig using the position measurement sensor;
    a table reference angle calculation step of calculating a reference angle from an angle of the table rotation axis in the initial position measurement step;
    a reference position measurement step of indexing the table rotation axis to the reference angle and indexes the main spindle head rotation axis to the initial angle to measure a reference position of the measured jig by the position measurement sensor;
    a relative position measurement step of indexing the table rotation axis to a plurality of predetermined angles based on the reference angle of the table rotation axis and indexing the main spindle head rotation axis to a plurality of predetermined angles to measure each position of the measured jig by the position measurement sensor;
    an arc approximation step of approximating the plurality of measured position values measured at the relative position measurement step into an arc; and
    an error calculation step of calculating an error of a center position of the rotation axis, a tilt error of the rotation axis, or a tilt error of the translational axis from the arc approximated in the arc approximation step.

2. The error identification method of the machine tool according to claim 1, wherein
    in the relative position measurement step, when combinations of the plurality of predetermined angles of the table rotation axis and the plurality of predetermined angles of the main spindle head rotation axis include a combination of the reference angle of the table rotation axis and the initial angle of the main spindle head rotation axis, the reference position measurement step is skipped, and
    in the relative position measurement step, the table rotation axis is indexed to the reference angle, and the measured position value which is measured by indexing the main spindle head rotation axis to the initial angle is defined as a measured value at the reference position.

3. The error identification method of the machine tool according to claim 1, wherein
    in the arc approximation step, a difference value between a command position of the measured jig and a measured position value of the measured jig is calculated using a predetermined angle of each of the rotation axes in the relative position measurement step, the command position being performed by coordinates transformation of the measured value at the reference position, and a plurality of the difference values are approximated into an arc.

4. The error identification method of the machine tool according to claim 2, wherein
    in the arc approximation step, a difference value between a command position of the measured jig and a measured position value of the measured jig is calculated using a predetermined angle of each of the rotation axes in the relative position measurement step, the command position being performed by coordinates transformation of the measured value at the reference position, and a plurality of the difference values are approximated into an arc.

\* \* \* \* \*